United States Patent
Wang et al.

(10) Patent No.: US 12,269,403 B2
(45) Date of Patent: Apr. 8, 2025

(54) MAIN DRIVER INFORMATION ACQUISITION-BASED VEHICLE CONTROL SYSTEM AND METHOD, AND VEHICLE

(71) Applicant: GUANGZHOU AUTOMOBILE GROUP CO., LTD., Guangdong (CN)

(72) Inventors: Min Wang, Guangdong (CN); Guizhong Deng, Guangdong (CN); Guangwei Ran, Guangdong (CN); Weiliang Luo, Guangdong (CN); Liang Li, Guangdong (CN); Pengxiang Chen, Guangdong (CN)

(73) Assignee: GUANGZHOU AUTOMOBILE GROUP CO., LTD., Guangdong (CN)

( * ) Notice: Subject to any disclaimer, the term of this patent is extended or adjusted under 35 U.S.C. 154(b) by 252 days.

(21) Appl. No.: 17/925,863

(22) PCT Filed: May 28, 2021

(86) PCT No.: PCT/CN2021/096710
§ 371 (c)(1),
(2) Date: Nov. 17, 2022

(87) PCT Pub. No.: WO2022/012184
PCT Pub. Date: Jan. 20, 2022

(65) Prior Publication Data
US 2023/0192020 A1    Jun. 22, 2023

(30) Foreign Application Priority Data
Jul. 14, 2020    (CN) .......................... 202010676625.5

(51) Int. Cl.
*B60R 16/037* (2006.01)
*B60R 11/00* (2006.01)
*B60R 11/02* (2006.01)

(52) U.S. Cl.
CPC ...... *B60R 16/0373* (2013.01); *B60R 11/0247* (2013.01); *B60R 2011/004* (2013.01)

(58) Field of Classification Search
CPC ............ B60R 16/0373; B60R 11/0247; B60R 2011/004; B60R 16/037
See application file for complete search history.

(56) References Cited

U.S. PATENT DOCUMENTS 8,874,301 B1    10/2014    Rao et al.
10,645,494 B1    5/2020    Oh et al.
(Continued)

FOREIGN PATENT DOCUMENTS

CN    105539359 A    5/2016
CN    106004735 A    10/2016
(Continued)

OTHER PUBLICATIONS

Original and translation of JP2010010749A (Year: 2010).*
Original and translation of KR102088590B1 (Year: 2020).*
WIPO, International Search Report issued on Aug. 4, 2021.

*Primary Examiner* — Frederick M Brushaber
(74) *Attorney, Agent, or Firm* — Hodgson Russ LLP

(57) ABSTRACT

The main driver information acquisition-based vehicle control system comprises a first ECU, a vehicle-mounted storage battery, a second ECU separately connected to the first ECU and the vehicle-mounted storage battery, and a microphone connected to the second ECU. The microphone is embedded on a door handle on one side of the driving position, and is used for obtaining voiceprint information. The second ECU is used for comparing the voiceprint information with a pre-entered voiceprint sample of a main driver, determining whether the voiceprint information is the main driver's, monitoring the electronic start status of a vehicle when the voiceprint information is the main driver's, and notifying the first ECU to control, according to prefer- (Continued)

ence information of the main driver, a device corresponding to the preference information of the main driver when monitoring that the vehicle enters an ACC or one-button start mode.

15 Claims, 5 Drawing Sheets

(56) References Cited

U.S. PATENT DOCUMENTS

| | | | | |
|---|---|---|---|---|
| 2012/0229253 A1* | 9/2012 | Kolar | ................... | B60R 25/257 |
| | | | | 340/5.61 |
| 2014/0316660 A1 | 10/2014 | Le et al. | | |
| 2017/0153636 A1* | 6/2017 | Boesen | ................ | B60R 16/037 |
| 2018/0253919 A1* | 9/2018 | Magner | ................... | B60R 25/01 |
| 2019/0016281 A1* | 1/2019 | Liu | ......................... | B60R 25/25 |
| 2020/0047687 A1* | 2/2020 | Camhi | ................... | G10L 15/22 |
| 2021/0049385 A1* | 2/2021 | Pinto | ..................... | B60R 16/037 |
| 2021/0049901 A1* | 2/2021 | Young | ..................... | H04W 4/46 |
| 2021/0129780 A1* | 5/2021 | Mezaael | ............... | H04W 8/205 |
| 2021/0323562 A1* | 10/2021 | You | .................. | G10K 11/17825 |

FOREIGN PATENT DOCUMENTS

| | | | | | |
|---|---|---|---|---|---|
| CN | 110015266 | A | | 7/2019 | |
| CN | 110182155 | A | | 8/2019 | |
| CN | 110525379 | A | * | 12/2019 | |
| CN | 110843725 | A | | 2/2020 | |
| CN | 212556129 | U | | 2/2021 | |
| JP | 2006276605 | A | | 10/2006 | |
| JP | 2009127334 | A | | 6/2009 | |
| JP | 2010010749 | A | * | 1/2010 | ............ H04R 3/005 |
| KR | 1020180018953 | A | | 2/2018 | |
| KR | 102088590 | B1 | * | 4/2020 | |
| WO | WO 2017022205 | A1 | | 2/2017 | |
| WO | WO 2020057513 | A1 | | 3/2020 | |

* cited by examiner

MAIN DRIVER INFORMATION ACQUISITION-BASED VEHICLE CONTROL SYSTEM AND METHOD, AND VEHICLE

CROSS-REFERENCE TO RELATED APPLICATIONS

This application is a 371 of International Application No PCT/CN2021/096710, filed May 28, 2021, which is based upon and claims priority to the Chinese patent application No. 202010676625.5, filed Jul. 14, 2020, the entire contents of which are referred and incorporated herein.

TECHNICAL FIELD

The present application relates to the technical field of vehicle control, and more particularly, to a main driver information acquisition-based vehicle control system, a method, and a vehicle.

BACKGROUND

With a rapid advancement of science and technology, people are pursuing a higher and higher quality of life, and vehicles have become an indispensable means of transportation for people's daily transportation. People are becoming increasingly picky about the comfort, safety, economy and individual requirements of vehicles and more and more vehicle companies have begun to conduct research on Internet vehicles. Generally, a suspended or placed microphone is provided inside the vehicle, and the in-vehicle microphone collects the driver's voice password information after the driver sit down and adjust the posture. This method has the following problems: 1. the in-vehicle microphone fails to involves in a face collection in advance, and it requires the driver to enter the cab to collect the voice password information, so that there is no smooth boarding and starting experience due to a sense of action pause in the driving experience. 2. Whether the in-vehicle microphone is suspended or placed, it will occupy a space in the vehicle, destroy a layout of the vehicle, and affect a safety performance of the vehicle.

SUMMARY

There are provided a main driver information acquisition-based vehicle control system, a method, and a vehicle. The technical solution is as below:

According to a first aspect of embodiments of the present disclosure, there is provided a main driver information acquisition-based vehicle control system, comprising:
 a first Electronic Control Unit (ECU);
 an in-vehicle battery;
 a second ECU, connected to the first ECU and the in-vehicle battery; and
 a microphone, connected to the second ECU;
 wherein the microphone is embedded in a door handle on a side of a driver seat, and is configured to obtain voiceprint information of a person about to enter the driver seat, and send the voiceprint information to the second ECU;
 the second ECU is configured to compare the voiceprint information with a pre-recorded voiceprint sample of a main driver, determine whether the voiceprint information belongs to the main driver, and monitor an electronic starting state of the vehicle when the voiceprint information belongs to the main driver;
 the second ECU is further configured to notify the first ECU to control a device corresponding to preference information of the main driver according to the preference information of the main driver, when the vehicle enters an Accessory power supply state (ACC) or an engine start state; and
 the first ECU is configured to control the device corresponding to the preference information of the main driver according to the preference information of the main driver.

According to a second aspect of embodiments of the present disclosure, there is provided a main driver information acquisition-based vehicle control method, executed on the above-mentioned system, comprising:
 step S31: obtaining voiceprint information of a person about to enter a driver seat;
 step S32: comparing the voiceprint information with a pre-recorded voiceprint sample of a main driver, and determining whether the voiceprint information belongs to the main driver;
 step S33: monitoring an electronic starting state of the vehicle, when the voiceprint information belongs to the main driver; and
 step S34: controlling a device corresponding to preference information of the main driver according to the preference information of the main driver.

According to a third aspect of embodiments of the present disclosure, there is provided a vehicle, comprising:
 the above-mentioned main driver information acquisition-based vehicle control system.

BRIEF DESCRIPTION OF THE DRAWINGS

In order to illustrate technical solutions of embodiments of the present application or technical solutions of the prior art more clearly, the drawings that are used in the description of the embodiments of the present application or the prior art will be introduced briefly as follows. Obviously, the drawings in the following description are only some embodiments of the present application, for those of ordinary skill in the art, other drawings may also be obtained from these drawings without creative labor.

DETAILED DESCRIPTION

The specific implementation will be further described below with reference to the accompanying drawings and embodiments.

Figure 1:
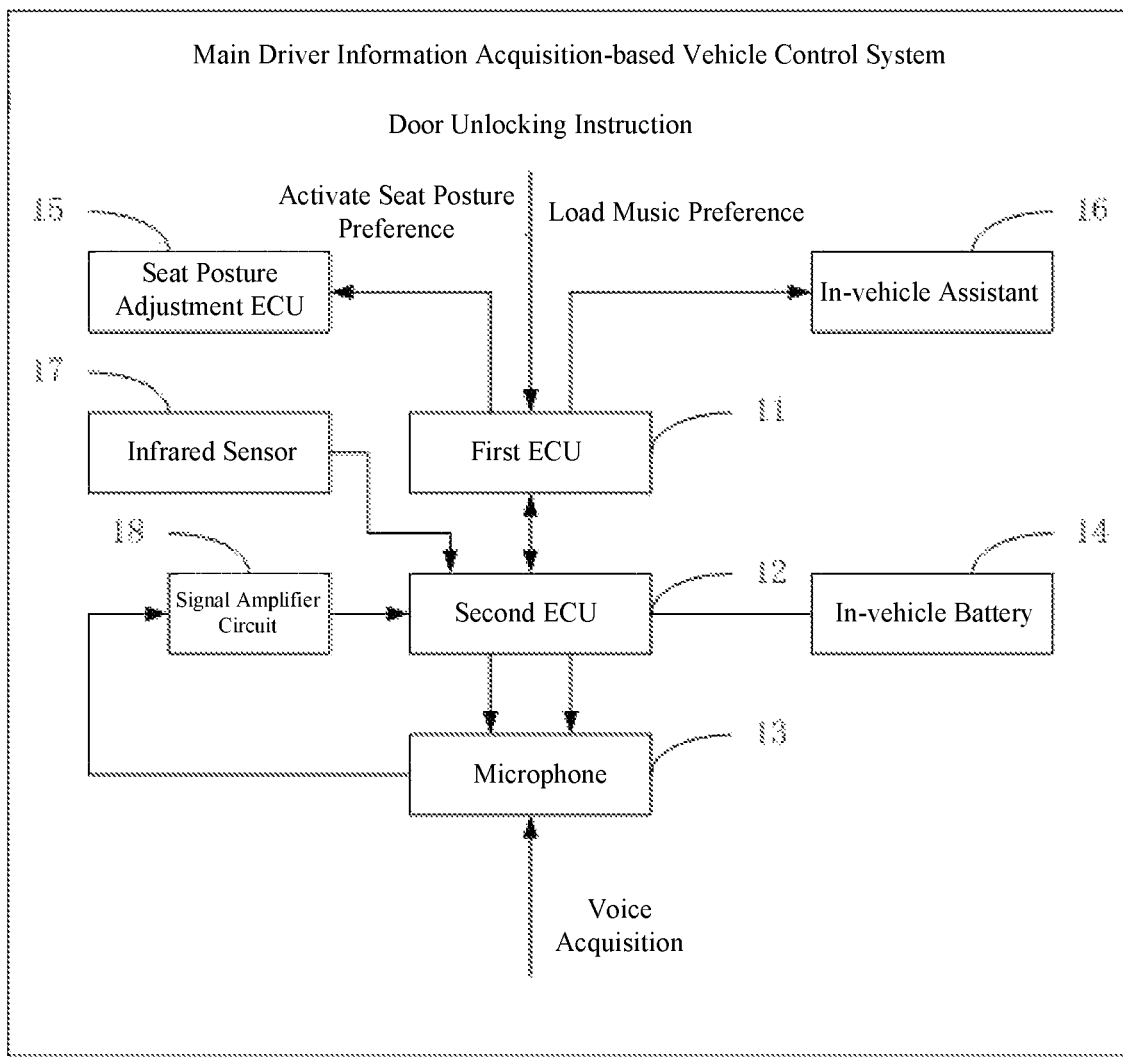
FIG. 1 is a structural diagram of a main driver information acquisition-based vehicle control system according to an embodiment of the present invention.

As shown in FIG. 1, an embodiment of the present invention provides a main driver information acquisition-based vehicle control system, including a first Electronic Control Unit (ECU) 11, an in-vehicle battery 14, a second Electronic Control Unit (ECU) 12 connected to the first ECU 11 and the in-vehicle battery 14, and the microphone 13 connected to the second ECU 12.

The microphone 13 is a waterproof microphone, which is embedded on a door handle on a side of the driver seat, and is configured to obtain voiceprint information of a person about to enter the driver seat, and send the voiceprint information to the second ECU 12.

It should be noted that the first ECU 11 refers to an in-vehicle ECU. The microphone 13 is embedded in the door handle on a side of the driver seat to save an inner space of the vehicle, and automatically record the person about to enter the drive seat after unlocking.

The second ECU 12 is configured to compare the voiceprint information with a pre-recorded voiceprint sample of the main driver, to determine whether the voiceprint information belongs to the main driver. The second ECU 12 is further configured to monitor an electronic starting state of the vehicle when the voiceprint information belongs to the main driver.

The second ECU 12 is further configured to notify the first ECU 11 to control a device corresponding to preference information of the main driver according to the preference information of the main driver, when the vehicle enters an Accessory power supply state (ACC) or an engine start state.

The first ECU 11 is configured to control a device corresponding to the preference information of the main driver according to the preference information of the main driver.

It should be noted that, if the person about to enter the driver seat belongs to the main driver, corresponding controls for the main driver are performed according to the preference information of the main driver in the subsequent steps.

The preference information includes, but is not limited to, a driver seat posture, loading preference music and whether to turn on the air conditioner.

It should be noted that the control of the device corresponding to the driver seat posture preference is to control a seat posture adjustment ECU 15 to adjust the driver seat, and a control of the device corresponding to the loading preference music is to control a multimedia player of an in-vehicle assistant 16 to start and load the preferred music.

In order to prevent the microphone 13 from being turned on for a long time, causing a waste of vehicle battery power, in the embodiment of the present invention, the in-vehicle ECU 11 is further configured to obtain a door unlocking instruction of the electronic vehicle key, and send the door unlocking instruction to the second ECU 12, and the second ECU 12 is further configured to trigger and wake up the microphone 13 according to the door unlocking instruction.

In the above manner, only after obtaining the door unlocking instruction, the microphone is woken up to work, achieving an effect of saving power.

Further, the system further includes an infrared sensor 17, which is arranged on the door handle on the driver side, and is configured to sense an infrared signal. The second ECU 12 is further configured to trigger the awakened microphone 13 to go dormancy when the infrared sensor 17 does not sense the infrared signal within a preset time.

It should be noted that if the door on the side of the driver seat is opened, but the driver never gets in the vehicle, the microphone will be triggered to go dormancy after a certain period of time, which also saves the battery power.

Further, the second ECU 12 is further configured to wake up the microphone 13 again when the door is in an unlocked state and the infrared sensor 17 senses an infrared signal.

In an embodiment of the present invention, the system further includes a signal amplifier circuit 18 connected to the second ECU 12 and the microphone 13.

The signal amplifier circuit 18 is configured to amplify the voiceprint information obtained by the microphone 13, and transmit the amplified voiceprint signal to the second ECU 12.

In an embodiment of the present invention, the system further includes a seat posture adjustment ECU 15 connected to the first ECU 11.

The first ECU 11 is specifically configured to control the seat posture adjustment ECU (15) according to a seat preference setting included in the preference information of the main driver, so as to adjust the driver seat according to the preference information of the main driver.

In another embodiment of the present invention, the system further includes an in-vehicle assistant 16 connected to the first ECU 11.

The first ECU 11 is specifically configured to control a multimedia player of the in-vehicle assistant 16 to start and load preferred music according to the preferred music included in the preference information of the main driver.

Further, the second ECU 12 further includes a motion sensor module and a GPS positioning module. The second ECU 12 is further configured to obtain a map track and a clock signal from the motion sensor module, obtain vehicle positioning information from the GPS positioning module, and form a travel path and a time node of a current driver according to the map track, the clock signal and the vehicle positioning information.

Figure 2:
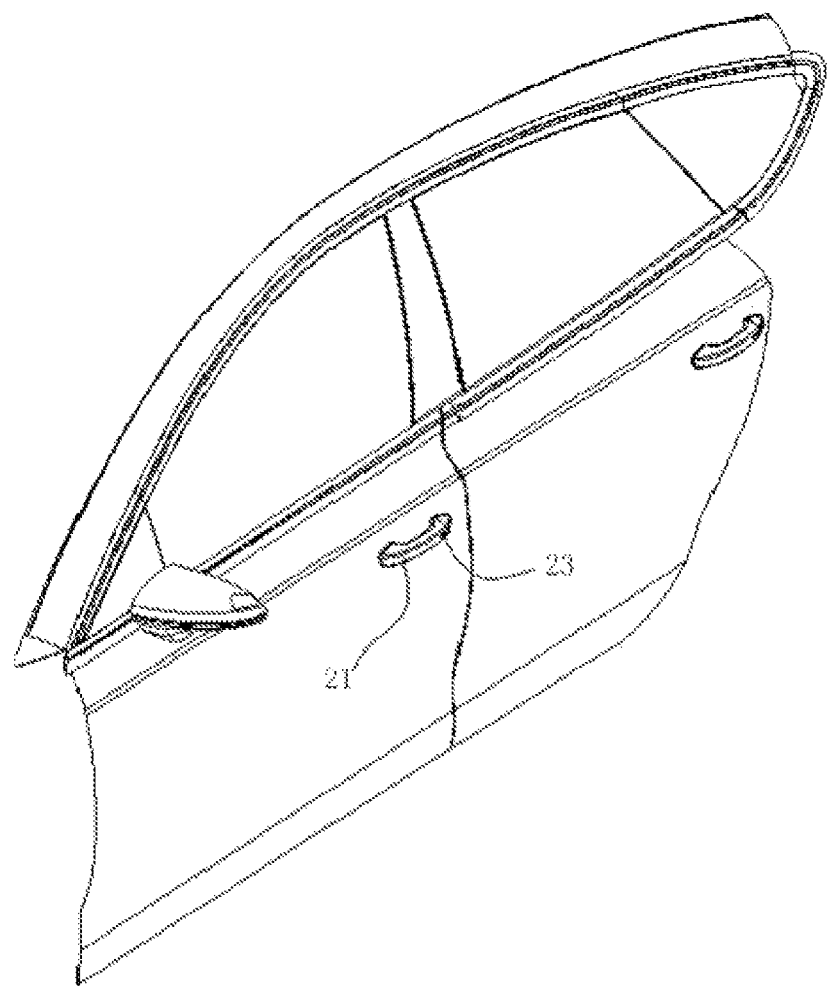
FIG. 2 illustrates a main driver door handle according to an embodiment of the present invention.
Figure 3:
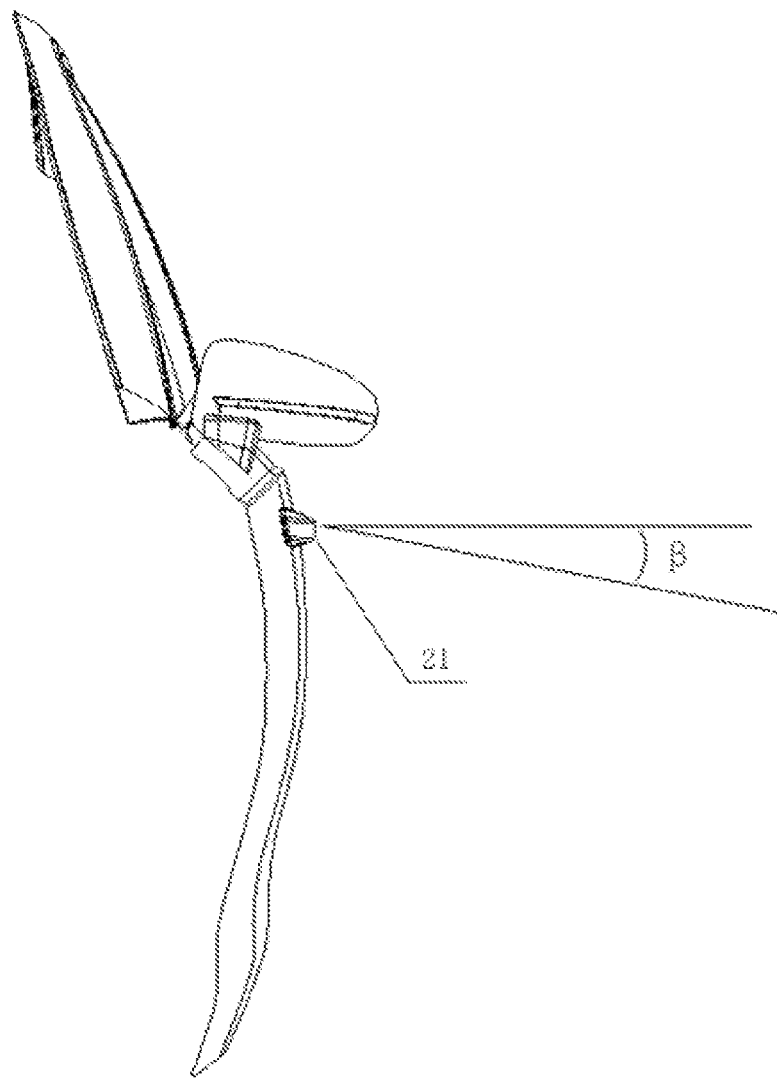
FIG. 3 illustrates a downward tilt angle of an axis of a microphone of the main driver door handle according to the embodiment of the present invention.
Figure 4:
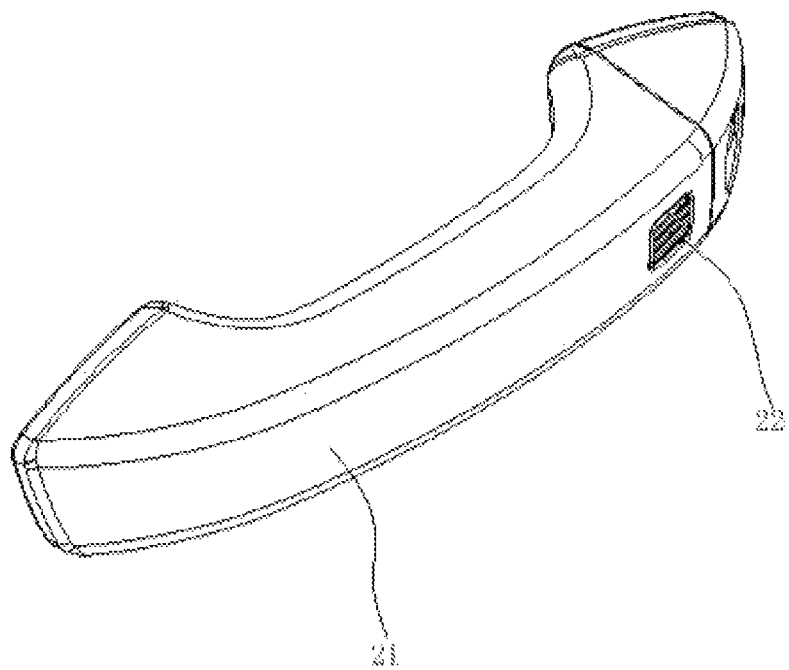
FIG. 4 illustrates an arrangement position of the microphone of the main driver door handle provided by an embodiment of the present invention.
Figure 5:
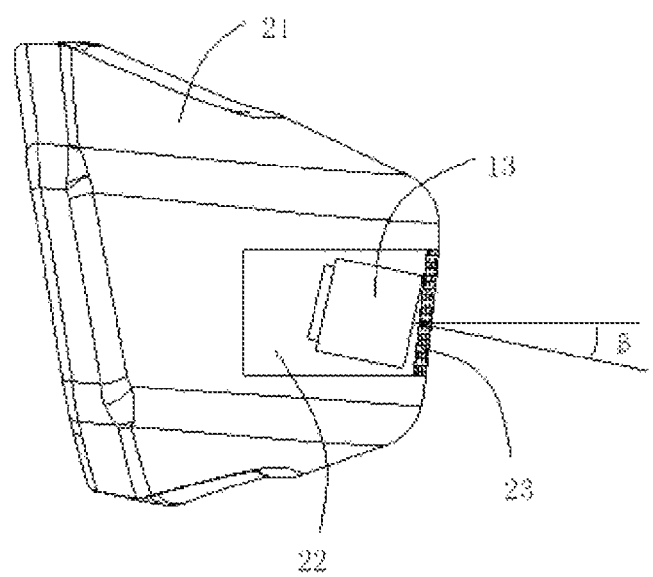
FIG. 5 is a structural diagram of the microphone of the main driver door handle during mounting according to an embodiment of the present invention.

As shown in FIG. 5, an embodiment of the present invention provides a microphone mounting structure. Combined with FIGS. 2-4, the microphone 13 is a waterproof microphone.

A microphone placement cavity 22 is arranged in the door handle 21, and the microphone 13 is arranged in the microphone placement cavity 22.

An opening is provided outside the door handle 21 for the microphone placement cavity 22, and a waterproof grid plate 23 is provided at the opening, which is inclined downward in a direction from an outside of the vehicle to an inside of the vehicle.

Further, the axis of the microphone 13 is arranged obliquely downward, at an angle of 15 degrees to the horizontal plane.

It should be noted that the use of a waterproof microphone, setting a waterproof grid plate, setting the waterproof grid plate inclined downward and the axis of the microphone downward are all to achieve a waterproof effect and ensure that the microphone is not wet or affected by water.

Figure 6:
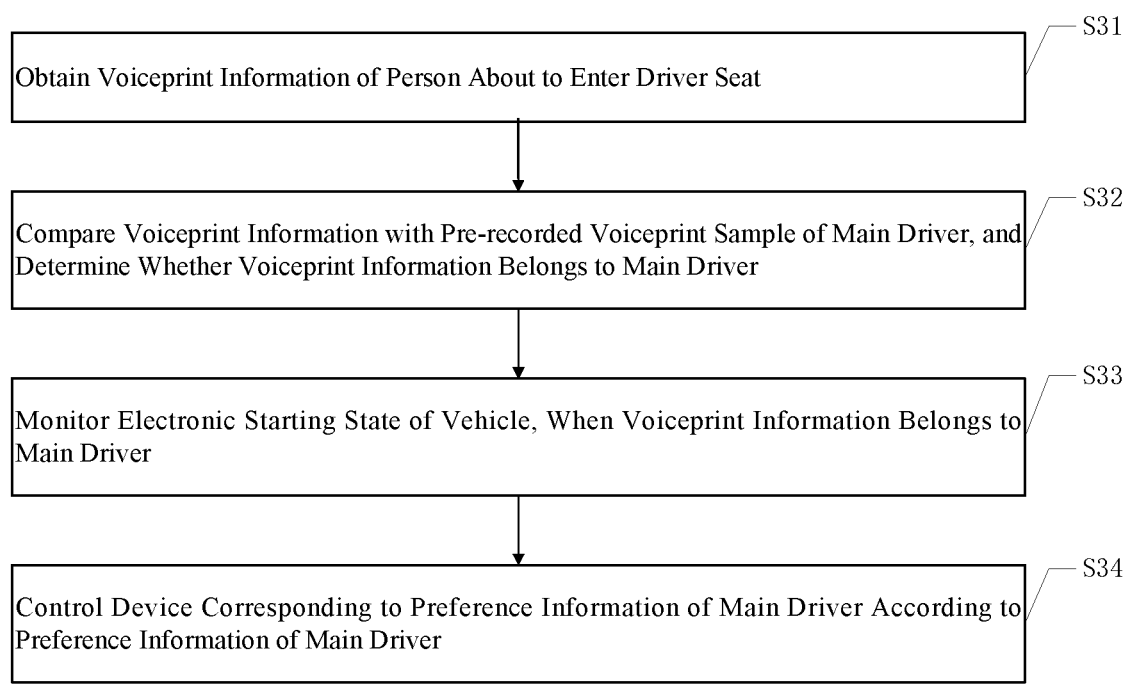
FIG. 6 is a flowchart of a main driver information acquisition-based vehicle control system according to an embodiment of the present invention.

As shown in FIG. 6, an embodiment of the present invention provides a main driver information acquisition-based vehicle control method, including the following steps.

Step S31: voiceprint information of a person about to enter a driver seat is obtained.

Step S32: the voiceprint information is compared with a pre-recorded voiceprint sample of a main driver, and whether the voiceprint information belongs to the main driver is determined.

Step S33: an electronic starting state of the vehicle is monitored, when the voiceprint information belongs to the main driver.

Step S34: a device corresponding to preference information of the main driver is controlled according to the preference information of the main driver, when the vehicle enters an Accessory power supply state (ACC) or an engine start state.

Further, before the method S31, the method further includes the following steps.

The door unlocking instruction of the electronic car key is obtained.

The microphone is triggered to wake up according to the door unlocking instruction.

An embodiment of the present invention provides a vehicle, includes the above-mentioned main driver information acquisition-based vehicle control system.

The present invention has the following beneficial effects.

In the present invention, a waterproof microphone is embedded in the door handle, to collect and obtain the voiceprint information when the door is opened. After the main driver is confirmed through comparison, the seat position is automatically adjusted, the driver's favorite music is played, and other driver's operations are executed once the vehicle starts, thereby solving the problems that the traditional method of obtaining voiceprint information destroys a structure and safety of the vehicle, and destroys a smoothness of the driving experience.

The above contents are a further detailed description of the present invention in conjunction with specific preferred embodiments, and it cannot be considered that the specific embodiment of the present invention is limited to these descriptions. For those of ordinary skill in the technical field of the present invention, without departing from the concept of the present invention, some simple deductions or substitutions may be made, which should be regarded as belonging to the protection scope of the present invention.

What is claimed is:

1. A main driver information acquisition-based vehicle control system, comprising:
    a first electronic control unit being an in-vehicle electronic control unit;
    an in-vehicle battery;
    a second electronic control unit, connected to the first electronic control unit and the in-vehicle battery; and
    a microphone, connected to the second electronic control unit;
    wherein the microphone is embedded in a door handle on a side of a driver seat, and is configured to obtain voiceprint information of a person about to enter the driver seat, and send the voiceprint information to the second electronic control unit;
    the second electronic control unit is configured to compare the voiceprint information with a pre-recorded voiceprint sample of a main driver, determine whether the voiceprint information belongs to the main driver, and monitor an electronic starting state of the vehicle when the voiceprint information belongs to the main driver;
    the second electronic control unit is further configured to notify the first electronic control unit to control a device corresponding to preference information of the main driver according to the preference information of the main driver, when the vehicle enters an accessory power supply state or an engine start state; and
    the first electronic control unit is configured to control the device corresponding to the preference information of the main driver according to the preference information of the main driver;
    wherein a microphone placement cavity is arranged in the door handle, and the microphone is arranged in the microphone placement cavity, an axis of which is arranged obliquely downward, at an angle of 15 degrees to a horizontal plane, and
    wherein an opening is provided outside the door handle for the microphone placement cavity, and a waterproof grid plate is provided at the opening, which is inclined downward in a direction from an outside of the vehicle to an inside of the vehicle;
    wherein the first electronic control unit is further configured to obtain a door unlocking instruction of an electronic vehicle key, and send the vehicle door unlocking instruction to the second electronic control unit, and
    the second electronic control unit is further configured to trigger and wake up the microphone according to the door unlocking instruction.

2. The main driver information acquisition-based vehicle control system of claim 1, further comprising:
    an infrared sensor, connected to the second electronic control unit, and arranged on the door handle at a position close to the driver seat;
    wherein the infrared sensor is configured to sense an infrared signal, and
    the second electronic control unit is further configured to trigger the awakened microphone to go dormancy when the infrared sensor does not sense the infrared signal within a preset time.

3. The main driver information acquisition-based vehicle control system of claim 2, wherein the second electronic control unit is further configured to awaken the microphone when the door is unlocked and the infrared sensor senses an infrared signal.

4. The main driver information acquisition-based vehicle control system of claim 1, further comprising:
    a signal amplifier circuit, connected to the second electronic control unit and the microphone;
    wherein the signal amplifier circuit is configured to amplify the voiceprint information obtained by the microphone, and transmit the amplified voiceprint signal to the second electronic control unit.

5. The main driver information acquisition-based vehicle control system of claim 1, further comprising:
    a seat posture adjustment electronic control unit, connected to the first electronic control unit;
    wherein the first electronic control unit is configured to control the seat posture adjustment electronic control unit according to a seat preference setting comprised in the preference information of the main driver, so as to adjust the driver seat according to the preference information of the main driver.

6. The main driver information acquisition-based vehicle control system of claim 1, further comprising:
    an in-vehicle assistant, connected to the first electronic control unit;
    wherein the first electronic control unit is configured to control a multimedia player of the in-vehicle assistant to start and load preferred music according to the preferred music comprised in the preference information of the main driver.

7. The main driver information acquisition-based vehicle control system of claim 1, wherein the second electronic control unit comprises:
    a motion sensor module; and
    a GPS positioning module;
    wherein the second electronic control unit is further configured to obtain a map track and a clock signal from the motion sensor module, obtain vehicle positioning information from the GPS positioning module, and form a travel path and a time node of a current driver according to the map track, the clock signal and the vehicle positioning information.

8. A main driver information acquisition-based vehicle control method, executed on the main driver information acquisition-based vehicle control system of claim 1, comprising:
step S31: obtaining voiceprint information of a person about to enter a driver seat;
step S32: comparing the voiceprint information with a pre-recorded voiceprint sample of a main driver, and determining whether the voiceprint information belongs to the main driver;
step S33: monitoring an electronic starting state of the vehicle, when the voiceprint information belongs to the main driver; and
step S34: controlling a device corresponding to preference information of the main driver according to the preference information of the main driver;
wherein before step S31, the method further comprises:
obtaining a door unlocking instruction of an electronic vehicle key; and
triggering a microphone to wake up according to the door unlocking instruction.

9. A vehicle, comprising:
a main driver information acquisition-based vehicle control system, comprising:
a first electronic control unit electronic control unit being an in-vehicle electronic control unit;
an in-vehicle battery;
a second electronic control unit, connected to the first electronic control unit and the in-vehicle battery; and
a microphone, connected to the second electronic control unit;
wherein the microphone is embedded in a door handle on a side of a driver seat, and is configured to obtain voiceprint information of a person about to enter the driver seat, and send the voiceprint information to the second electronic control unit;
the second electronic control unit is configured to compare the voiceprint information with a pre-recorded voiceprint sample of a main driver, determine whether the voiceprint information belongs to the main driver, and monitor an electronic starting state of the vehicle when the voiceprint information belongs to the main driver;
the second electronic control unit is further configured to notify the first electronic control unit to control a device corresponding to preference information of the main driver according to the preference information of the main driver, when the vehicle enters an accessory power supply state or an engine start state; and
the first electronic control unit is configured to control the device corresponding to the preference information of the main driver according to the preference information of the main driver;
wherein the microphone is a waterproof microphone,
wherein a microphone placement cavity is arranged in the door handle, and the microphone is arranged in the microphone placement cavity, an axis of which is arranged obliquely downward, at an angle of 15 degrees to a horizontal plane, and
wherein an opening is provided outside the door handle for the microphone placement cavity, and a waterproof grid plate is provided at the opening, which is inclined downward in a direction from an outside of the vehicle to an inside of the vehicle;
wherein the first electronic control unit is further configured to obtain a door unlocking instruction of an electronic vehicle key, and send the vehicle door unlocking instruction to the second electronic control unit, and
the second electronic control unit is further configured to trigger and wake up the microphone according to the door unlocking instruction.

10. The vehicle of claim 9, further comprising:
an infrared sensor, connected to the second electronic control unit, and arranged on the door handle at a position close to the driver seat;
wherein the infrared sensor is configured to sense an infrared signal, and
the second electronic control unit is further configured to trigger the awakened microphone to go dormancy when the infrared sensor does not sense the infrared signal within a preset time.

11. The vehicle of claim 10, wherein the second electronic control unit is further configured to awaken the microphone when a door is unlocked and the infrared sensor senses an infrared signal.

12. The vehicle of claim 9, further comprising:
a signal amplifier circuit, connected to the second electronic control unit and the microphone;
wherein the signal amplifier circuit is configured to amplify the voiceprint information obtained by the microphone, and transmit the amplified voiceprint signal to the second electronic control unit.

13. The vehicle of claim 9, further comprising:
a seat posture adjustment electronic control unit, connected to the first electronic control unit;
wherein the first electronic control unit is configured to control the seat posture adjustment electronic control unit according to a seat preference setting comprised in the preference information of the main driver, so as to adjust the driver seat according to the preference information of the main driver.

14. The vehicle of claim 9, further comprising:
an in-vehicle assistant, connected to the first electronic control unit;
wherein the first electronic control unit is configured to control a multimedia player of the in-vehicle assistant to start and load preferred music according to the preferred music comprised in the preference information of the main driver.

15. The vehicle of claim 9, wherein the second electronic control unit comprises:
a motion sensor module; and
a GPS positioning module;
wherein the second electronic control unit is further configured to obtain a map track and a clock signal from the motion sensor module, obtain vehicle positioning information from the GPS positioning module, and form a travel path and a time node of a current driver according to the map track, the clock signal and the vehicle positioning information.

* * * * *